No. 695,139. Patented Mar. 11, 1902.
O. BENSON.
RAKE ATTACHMENT.
(Application filed May 20, 1901.)
(No Model.)

Witnesses:
L. E. Wickman.
N. L. Thauwald.

Inventor:
Olaf Benson.
per: Stykert Bradbury
Attorneys.

THE NORRIS PETERS CO., PHOTO-LITHO., WASHINGTON, D. C.

UNITED STATES PATENT OFFICE.

OLAF BENSON, OF RED WING, MINNESOTA.

RAKE ATTACHMENT.

SPECIFICATION forming part of Letters Patent No. 695,139, dated March 11, 1902.

Application filed May 20, 1901. Serial No. 61,029. (No model.)

*To all whom it may concern:*

Be it known that I, OLAF BENSON, a citizen of the United States, residing at Red Wing, in the county of Goodhue and State of Minnesota, have invented certain new and useful Improvements in Rake Attachments, of which the following is a specification.

My invention relates to improvements in rake attachments, its purpose being to clean the teeth of rakes from debris with which they become entangled while in use.

Among the advantages which I claim for my attachment are saving of time and annoyance in removing the grass, leaves, straw, and other litter which catch upon the rake-teeth, as well as protection of the hands from filth, by making it unnecessary to handle the litter attached to the teeth.

My invention consists, in combination with the rake, of a spring-frame inclosing the rake-head adapted normally to rest above the teeth and when depressed to clean them.

Figure 1:
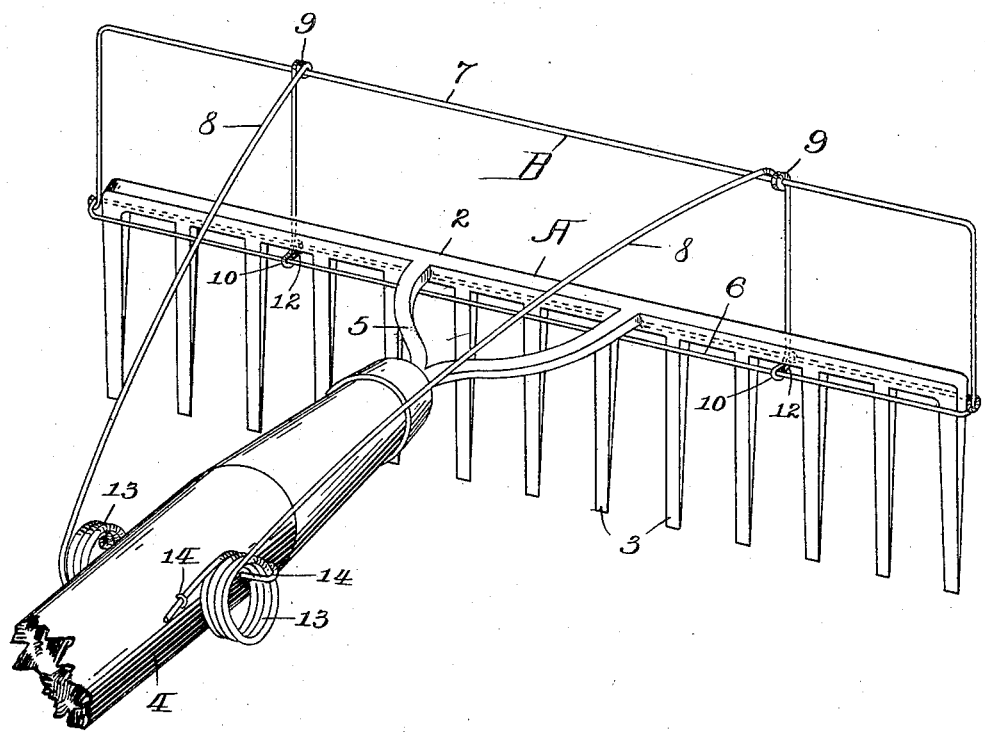
Figure 2:
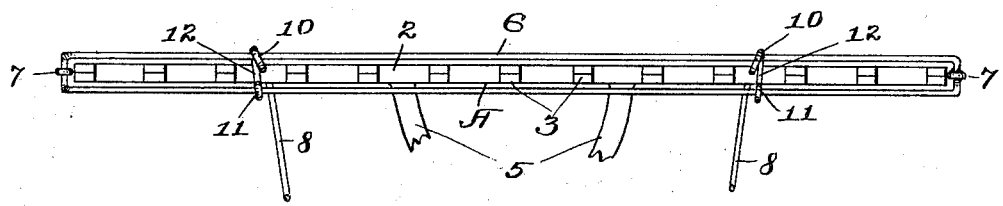

In the accompanying drawings, forming part of this specification, Figure 1 is a perspective view of a rake, showing my improved attachment in normal position; and Fig. 2 is a detail view of the same looking directly at the points of the teeth.

In the drawings let A represent a rake of ordinary construction, such as is used by hand and commonly known as a "garden-rake." This rake is formed with the head 2 and row of teeth 3 and is provided with the handle 4, which is attached to the head by the flange 5.

My invention consists of a skeleton frame B, which, as shown, is made of wire. This frame is formed with the ejector 6, which incloses the head of the rake and is reinforced by the loop 7. The ejector is adapted to slide vertically upon the teeth by means of the pair of spring-arms 8, the diverging ends of which are connected to the loop 7 at 9 and to the ejector 6 at 10 and 11. These ends where connected to the ejector bridge the teeth, so as to form stops 12 for the ejector against the head of the rake when the frame is in superior position. The other ends of the spring-arms are coiled into the spring-loops 13, which are attached to the handle of the rake by the staples 14.

When the rake is in use, the skeleton frame is held in superior position by the spring-arms, as shown in Fig. 1, and when it is desired to clean the rake it is turned over and the frame pressed against the ground, thus sliding the ejector toward the points of the teeth and quickly removing the debris caught upon the teeth. When the rake is raised, the ejector springs back to normal position automatically.

Having described my invention, what I claim as new, and desire to protect by Letters Patent, is—

1. An attachment for rakes, consisting of a wire frame formed with an ejector which incloses the head of the rake and having a reinforcing-loop above said head, a pair of spring-arms, diverging toward and connected with said loop and ejector, and which bridge the teeth of the rake to form stops for the ejector against the head of the rake, and a pair of spring-coils formed on the inner ends of said arms and attached to the handle of the rake for the purposes specified.

2. An attachment for rakes, consisting of an ejector 6 formed by a wire frame inclosing the head of the rake, a reinforcing-loop 7 attached to the ends of said ejector, a pair of arms 8 attached to said loop and ejector, a pair of spring-loops formed on said arms and attached to the handle of the rake, and a pair of stops 12, bridging the teeth of the rake and attached to said ejector.

In testimony whereof I have signed my name to this specification in the presence of two subscribing witnesses.

OLAF BENSON.

Witnesses:
F. G. BRADBURY,
L. E. WICKMAN.